July 10, 1962
F. C. BREMER
3,043,506
ENVELOPE CONSTRUCTION
Filed March 7, 1960
2 Sheets-Sheet 2
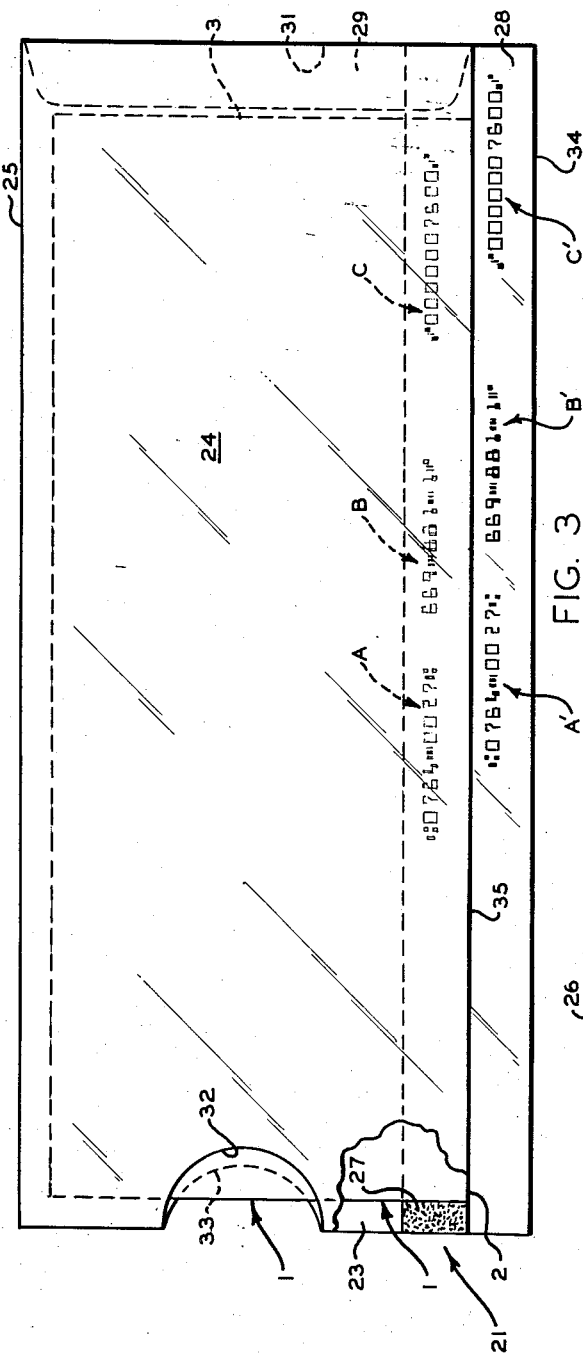
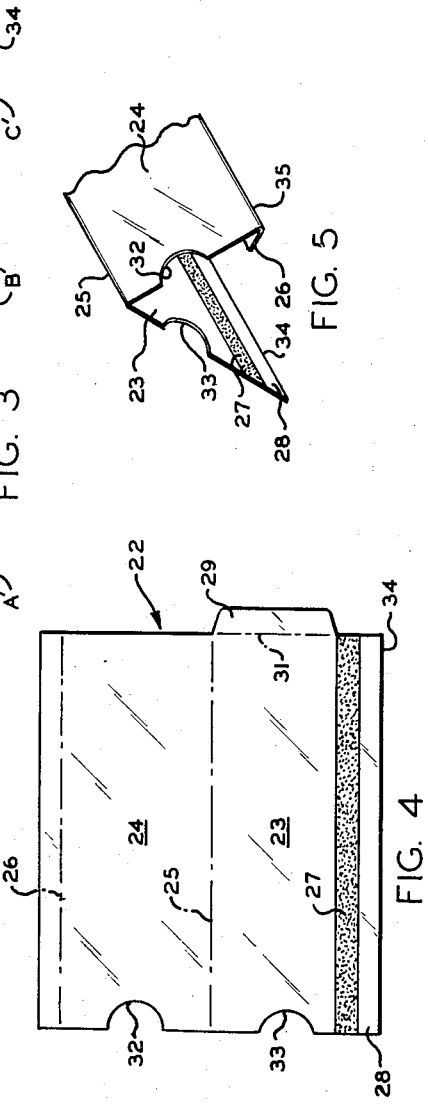
INVENTOR.
FRED C. BREMER
BY
ATTORNEYS United States Patent Office 3,043,506
Patented July 10, 1962

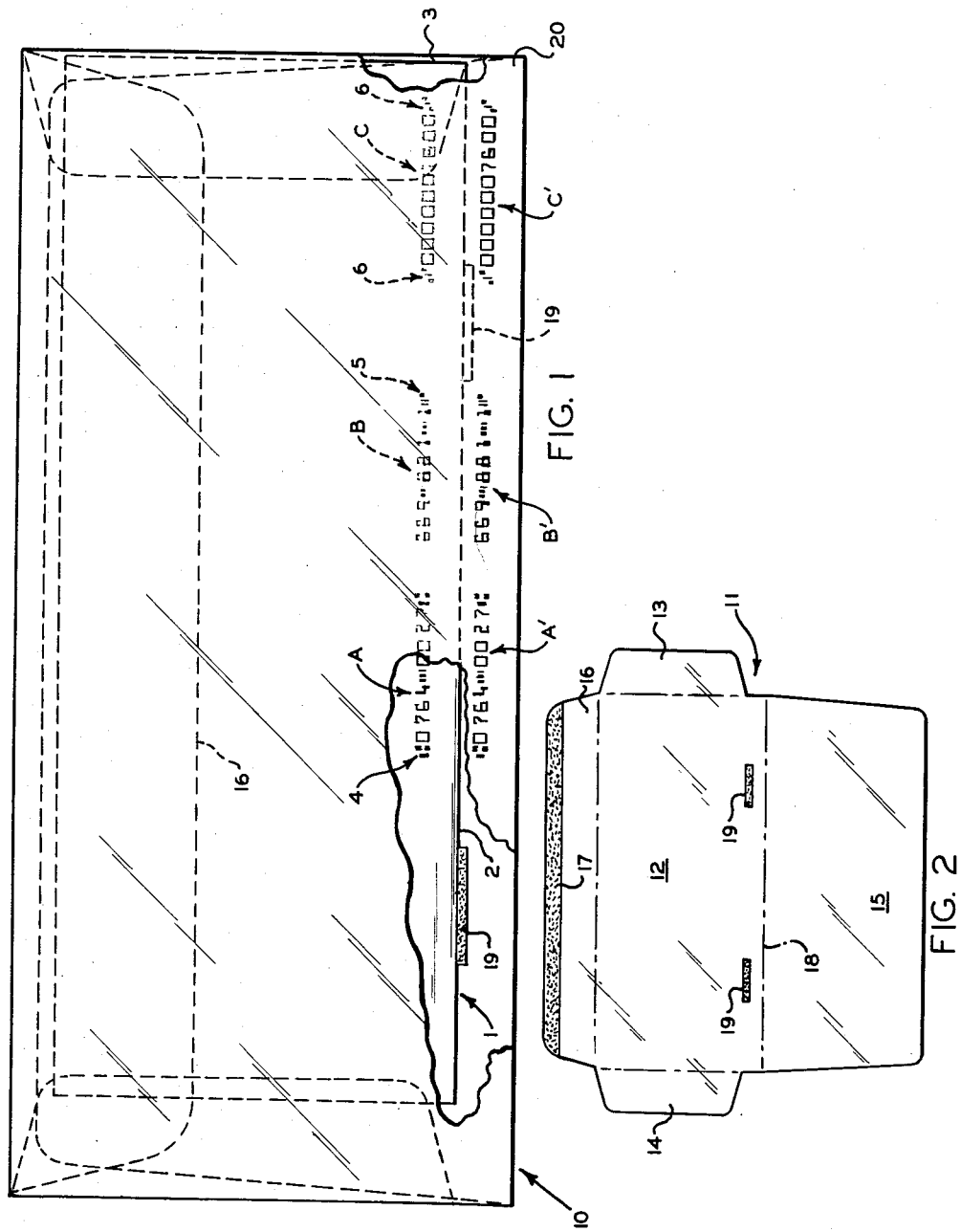

3,043,506
ENVELOPE CONSTRUCTION
Fred C. Bremer, Saginaw, Mich., assignor of thirty percent to James M. Shackleton, Saginaw, and eighteen percent to Leonard M. Selden, Lansing, Mich.
Filed Mar. 7, 1960, Ser. No. 13,327
4 Claims. (Cl. 235—61.12)

This invention relates to envelope constructions and more particularly to envelope constructions particularly adapted for use with automatic check sorting machinery of the kind about to be placed in use in banks and banking institutions throughout the country.

Within the next few months banking institutions throughout the country will begin the mechanized sorting and accounting of checks and other papers. It already has been determined that checks and other papers to be handled by the mechanical apparatus will be provided with a 5/8 inch wide area along their bottom edges adapted to receive special characters printed in magnetic ink. When such documents are introduced to the special machinery, magnetically responsive apparatus of the machinery will react to the magnetic ink characters and actuate various components of the machinery to sort the documents in accordance with a predetermined plan.

As is well known, all banks on which checks are drawn have an identification number and this identification number customarily appears on the face of each check payable at a bank. Identification numbers are used in clearing house operations and the number of any particular bank will remain the same irrespective of whether a check is one issued by the bank itself or by a customer of the bank. Accordingly, it is proposed that the checks to be printed in the future for distribution by a bank to its customers or for its own use be preprinted with magnetic ink characters corresponding to the bank's identification number. It also has been proposed that each bank establish an account number for each of its own and its depositors' accounts so that all checks issued to a customer or to be used by the bank also may be preprinted with the appropriate account number.

It also has been proposed that space be provided on each check in which the amount of the check may be included by typewriter-like machines which will imprint the amount for which the check was written in magnetic ink.

When a check having the three sets of identifying symbols imprinted thereon is presented to any bank or banking institution anywhere in the country, it may be processed mechanically by the machines above referred to, thereby eliminating to a large extent a great deal of clerical handling heretofore required in the check collection process and will materially speed the collection process.

Despite the best efforts on the part of both bank personnel and bank customers, there inevitably will be some checks or similar documents which will be defaced, torn or otherwise rendered unsuitable for processing by the automatic machinery. Checks of this kind will be rejected by the machines and unless some provision is made to handle rejected checks they will have to be handled manually at every stage of the collection process.

An object of this invention is to provide an envelope or carrier construction which is capable of supporting a defaced, mutilated or otherwise defectively marked check or other document which is incapable of being processed properly by mechanized check sorting machinery of the kind referred to above.

Another object of the invention is to provide a check carrier or envelope which is so constructed as to be able to carry a check and serve as a substitute for the check in the automatic processing machinery.

A further object of the invention is to provide a check carrier or envelope which is of such construction as to enable a check or the like to be enclosed within the envelope but which will enable the check to be examined without the necessity of removing it from the envelope.

Other objects and advantages of the invention will be pointed out specifically or will become apparent from the following description when it is considered in conjunction with the appended claims and the accompanying drawings, in which:

FIGURE 1 is a plan view, partly broken away, of an envelope constructed in accordance with one embodiment of the invention and containing a check;

FIGURE 2 is a plan view, on a reduced scale, of a blank which may be folded and have its parts secured to one another in a manner to form the envelope shown in FIGURE 1;

FIGURE 3 is a view similar to FIGURE 1, but illustrating another form of the invention;

FIGURE 4 is a plan view of a blank which may be used in forming the envelope shown in FIGURE 3; and FIGURE 5 is a fragmentary, perspective view illustrating the manner in which the blank of FIGURE 4 may be folded prior to forming the envelope shown in FIGURE 3.

A check or the like of the kind with which the invention is adapted for use is indicated in FIGURES 1 and 3 as comprising a piece of paper 1 having adjacent to its lower edge a plurality of groups of magnetic ink characters of the kind which will be in use in the mechanized check sorting system. One of these groups of numbers is identified by the reference character A and group A, according to present plan, will be the numbers identifying a particular bank. Group B will, according to the present plan, indicate the particular account of the bank on which the check is drawn and group C will indicate the amount for which the check is drawn. The groups of numbers are so located on the check 1 as to lie substantially at the center of a band extending 5/8 inch from the bottom edge 2 of the check towards its opposite edge and all groups of numbers are precisely located from the right hand edge 3 of the check. All of the characters of group A must be located between two symbols 4 which define a field known as the "transit number" field; all of the characters of group B are located in a field referred to as the "on us" field and which, in FIGURES 1 and 3, is defined at its right hand boundary by a symbol 5; and all of the characters of group C are located within what is referred to as the "amount" field, which is bracketed by two symbols 6. The field boundaries are precisely located from the right hand edge 3 of the check and, for example, the left and right boundaries, respectively, of the amount field are located 1⅞ inches and ¼ inch from the right hand edge 3. A tolerance of ±1/16 inch is allowed for the fields from the right hand edge 3 of the check.

All of the characters of groups A, B and C are required to have a nominal height of .117 inch and should be located on the 5/8 inch wide strip in a band ¼ inch high with its lower edge no less than 3/16 inch from the bottom edge 2 of the check 1. These dimensions are important because if the characters of the groups extend above the top edge of the ¼ inch band, the magnetic scanning mechanism of the automatic machinery may not be capable of handling the checks accurately, even though the scanning mechanism is designed to scan a 5/8 inch wide belt. Consequently, all check printers are standardizing their work so that checks will conform to the dimensions above mentioned.

Should the groups of symbols placed on the check 1 be free of imperfections and should the check itself be unmutilated, it will, when presented to one of the automatic machines, ordinarily be processed completely automatically and no difficulty in its handling will be encountered. Should the check for some reason be rejected by the machine, however, it may pass to a clerk who will place it in an envelope formed in accordance with the invention and then encode the envelope in a manner which subsequently will be described.

An envelope constructed in accordance with the embodiment of the invention disclosed in FIGURES 1 and 2 is represented generally by the reference character 10 and is formed from a blank 11 of paper or the like which preferably is transparent for a purpose to be explained. The blank 11 comprises a wall or panel 12 having a pair of tabs 13 and 14 located one at either end of the panel 12, the tabs having at their extreme edges adhesive means (not shown) to enable them to be secured to a panel 15 forming an extension at one edge of the panel 12. The other edge of the panel 12 includes another extension or flap 16, having its extreme edge provided with adhesive means 17 which will permit it to be secured to the panel 15.

As is best shown in FIGURE 2, the tabs 13 and 14 are not as long as the panel 12 is wide, but terminate short of a fold line 18 which separates the panel 12 from the panel 15. In a conventional envelope the fold line 18 ordinarily would form the bottom of the envelope.

Along an imaginary line extending from the terminal edge of one tab 13 towards the terminal edge of the other tab 14 are provided two or more adhesive areas 19 which, when the panels 12 and 15 are folded towards one another along the line 18, will enable the adjacent portions of the panels 12 and 15 in the area of the adhesive 19 to be securely fastened to one another and thereby form a false bottom of the envelope. Instead of providing only a few adhesive areas, the entire length of the panel 12 below the imaginary line joining the terminal ends of the tabs could be gummed, but it is sufficient to provide only enough adhesive areas to assure the check's being supported above the fold line 18.

To form the envelope 10 from the blank 11, the tabs 13 and 14 are folded over the panel 12 and their adhesive edges moistened simultaneously with the moistening of the adhesive 19. The panel 15 then is folded over the tabs 13 and 14 and the panel 12 and is secured to both of the tabs and to the adhesive areas 19. There thus is formed a hollow receptable, closed on three sides, in which the check 1 may be received, but the envelope will have an extension or strip 20 along its bottom edge extending below the false bottom formed by the adhesive areas 19. For purposes of discussion, the panel 12 will be considered the front wall of the finished envelope and the panel 15 the rear wall. Which wall is the front or back, however, makes little or no difference since the walls are transparent. The edge of the envelope adjacent to the extension 16 will be open prior to the placing of a check in the receptacle, but it may be closed, if desired, by moistening the adhesive 17 and folding the flap 16 over the panel 15 so as to prevent removal of the check from the envelope.

When a clerk is given a check which has been rejected by the scanning machine, he will place the check in one of the envelopes 10 so that its face is visible through the front panel or wall 12 of the envelope 10 and then place the envelope in a special typewriter-like machine and encode the strip 20 with the identical characters present in groups A, B and C. These characters are indicated by the reference characters A', B' and C' in FIGURE 1. Since the envelope containing the check will be presented to the check processing machinery, it is important that the groups of characters encoded on the strip 20 be located in a manner corresponding to the location of the groups of numbers on the check. Thus, the locations of the fields of the groups of numbers A', B' and C' should correspond to the prescribed location of the fields of the characters A, B and C, as aforesaid.

The folding over of the tabs 13 and 14 forms multiple ply seams at the ends of the envelope. In order to avoid any possibility of uneven encoding of the characters on the strip 20, it is important that the thickness of the strip 20 be uniform, at least in the regions where the groups of symbols A', B' and C' will appear. Accordingly, it is to prevent uneven thicknesses of the strip 20 that the tabs 13 and 14 terminate short of the lower edge of the front wall 12.

The vertical arrangement of the groups of characters A', B' and C' on the strip 20 is as important as is the arrangement of the groups of characters A, B and C on the check. Accordingly, the groups of characters A', B' and C' should correspond in size and location to the specifications hereinbefore described.

Also of considerable importance is the width of the strip 20 or, stated differently, the location of the adhesive areas which form the false bottom of the envelope. The magnetic scanning mechanism of the processing machinery scans a field measuring ⅝ inch in a vertical direction. Accordingly, the false bottom must be so located that a check received in the envelope is supported at a height such that the groups of characters A, B and C are raised out of the field scanned by the scanning mechanism during passage of the envelope and check through the machine. If it could be depended upon, without question, that the locations of the groups of characters A, B and C on a check always would be properly centered with respect to the ¼ inch band and that the band itself would be properly located, the minimum width of the strip 20 could safely be made ⅜ inch. However, because it is not possible to assure proper centering of the groups of characters A, B and C, the depth of the false bottom of the envelope preferably should be a minimum of ⁷⁄₁₆ inch.

In FIGURES 3, 4 and 5 is disclosed a modified form of envelope 21 formed from a blank 22 of transparent material and having a rear wall or panel 23 integrally joined to a front panel 24 that is adapted to be folded over the rear panel 23 along the line 25. The front panel is adapted to be folded between its edges to form a flap 26 that may be secured to a gummed area 27 which is located adjacent to the free edge of the rear panel 23, but above the free edge of the latter so as to define a strip or extension 28 on which the groups of characters A', B' and C' may be encoded as is shown in FIGURE 3. One end of the rear wall 23 is provided with a tab 29 the extreme edge of which is gummed to enable the tab 29 to be folded over the rear panel 23 along the line 31 and be secured to the front wall between the latter and the wall 23 so as to form a receptacle for the check 1.

The front and rear panels are provided with notches 32 and 33, respectively, which facilitate the opening of the envelope to deposit a check therein and to facilitate removal of a check from the envelope. If desired, one of the notches, such as the notch 32, may be somewhat deeper than the other.

When the blank 22 has been folded and its edges secured in the manner disclosed in FIGURES 3 and 5, the strip 28 forms a single thickness extension on which the groups of characters A', B' and C' may be encoded and it will be noted that the tab 29 terminates short of the strip 28 so as to provide a strip of uniform thickness. That is, no seam appears on the strip 28. The dimensions of the strip 28 from its lower edge 34 to the bottom edge 35 of the receptacle should correspond to the dimensions previously referred to for the strip 20.

It makes no difference whether or not the groups of characters A, B or C on the check 1 are aligned with the groups of characters A', B' and C' encoded on the strip 28 inasmuch as the groups of characters A, B and C will be supported out of the field of the scanning mechanism of the check processing machine. To illustrate this characteristic, the check 1 is shown in FIGURE 3 as being offset to the left of the groups of characters A', B' and C', but it is preferred that the length of the envelope correspond as closely as possible to the length of the check.

Alternatively to the construction shown in FIGURES 3, 4 and 5, it is not necessary that the flap 26 be provided. Instead, the panel 24 could be cut at the line 35 or the free edge of the panels 24 could be made to coincide with the free edge of the panel 23 and the adhesive area 27 extended to the free edge of the panel 23. In the former case the strip 28 would be of single thickness and in the latter case the strip would be of double thickness.

The disclosed embodiments are representative of presently preferred forms of the invention, but are intended to be illustrative rather than definitive thereof. The invention is defined in the claims.

I claim:

1. A substantially rectangular envelope for use in conjunction with checks or the like having special indicia thereon adjacent their bottom edges so as normally to permit said checks to be moved past scanning apparatus positioned adjacent to the path of movement of said indicia and capable of reacting to the indicia on said checks, said envelope being adapted for movement past said apparatus, being formed of sheet material and having front and rear walls overlying and being joined to one another along one of the longer and one of the shorter sides, the joining of said walls along said one of the longer sides being provided by adhesive means securing said front and rear walls to one another adjacent said one of said longer sides to form a receptacle having an open side and a bottom constituted by said adhesively secured wall portions, said bottom being adapted to support the bottom edge of a check in said receptacle, and at least one of said walls extending beyond said bottom to provide an imperforate extension extending the full length of said one of said longer sides and projecting beyond the confines of said receptacle a minimum distance of ⅜ inch, whereby a check contained in said receptacle may be supported in a position to prevent said scanning apparatus from reacting to the indicia on said check, said imperforate extension including not more than two thicknesses of said sheet material.

2. The construction set forth in claim 1 wherein the sheet material forming one of said walls terminates short of the sheet material forming the other of said walls adjacent said one of said longer sides, whereby said extension comprises a single thickness of said sheet material.

3. The construction set forth in claim 1 wherein said walls are coextensive in length and width whereby said extension comprises two thicknesses of said sheet material.

4. A substantially rectangular envelope for use in conjunction with checks or the like having special indicia thereon adjacent their bottom edges so as normally to permit said checks to be moved past scanning apparatus positioned adjacent to the path of movement of said indicia and capable of reacting to the indicia on said checks, said envelope being adapted for movement past said apparatus, being formed of sheet material and having front and rear walls overlying and being joined to one another along three sides, the joining of said walls along one of the longer sides being provided by adhesive means securing said front and rear walls to one another adjacent said one of said longer sides to form a receptacle having an open side and a bottom constituted by said adhesively secured wall portions, said bottom being adapted to support the bottom edge of a check in said receptacle, and at least one of said walls extending beyond said bottom to provide an imperforate extension extending the full length of said one of said longer sides and projecting beyond the confines of said receptacle a minimum distance of ⅜ inch, whereby a check contained in said receptacle may be supported in a position to prevent said scanning apparatus from reacting to the indicia on said check, said imperforate extension including not more than two thicknesses of said sheet material.

References Cited in the file of this patent

UNITED STATES PATENTS

| | | |
|---|---|---|
| 897,778 | Post | Sept. 1, 1908 |
| 1,436,885 | Leary | Nov. 28, 1922 |
| 1,985,114 | Storer | Dec. 18, 1934 |
| 2,346,419 | Dunlop | Apr. 11, 1944 |
| 2,508,953 | Knutsen | May 23, 1950 |
| 2,675,170 | Sebesta | Apr. 13, 1954 |
| 2,693,909 | Allan | Nov. 9, 1954 |
| 2,742,222 | Braccio | Apr. 17, 1956 |
| 2,890,825 | Patrick | June 16, 1959 |
| 2,970,757 | McWhirter | Feb. 7, 1961 |